N. CRANK.
TIRE HEATING FURNACE.
No. 175,671. Patented April 4, 1876.
*Fig: 1.*
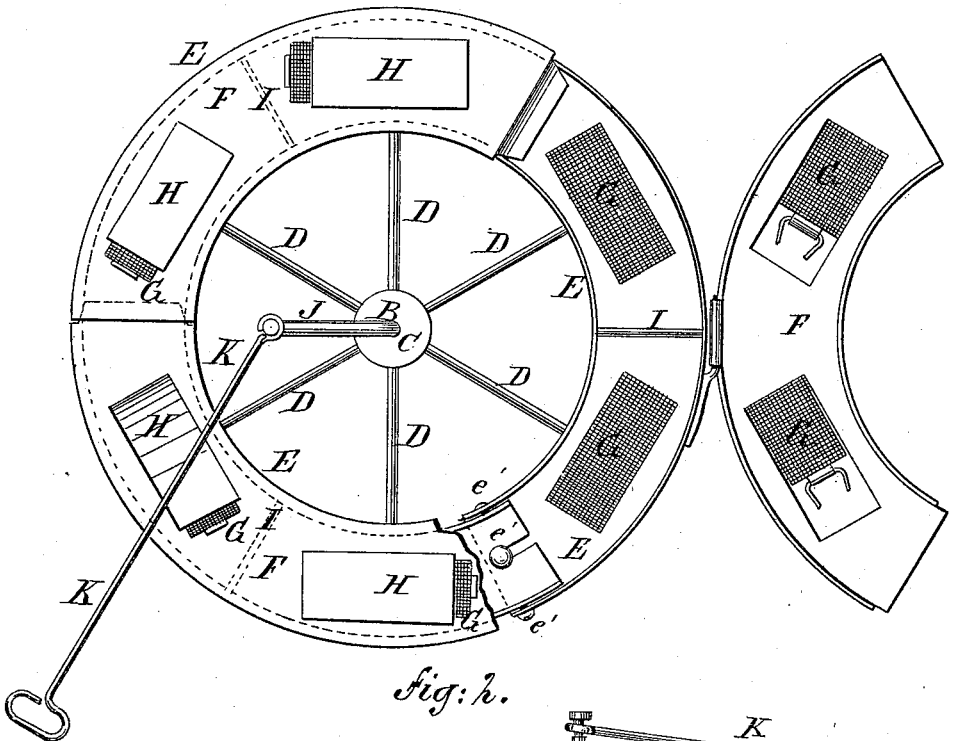
*Fig: 2.*
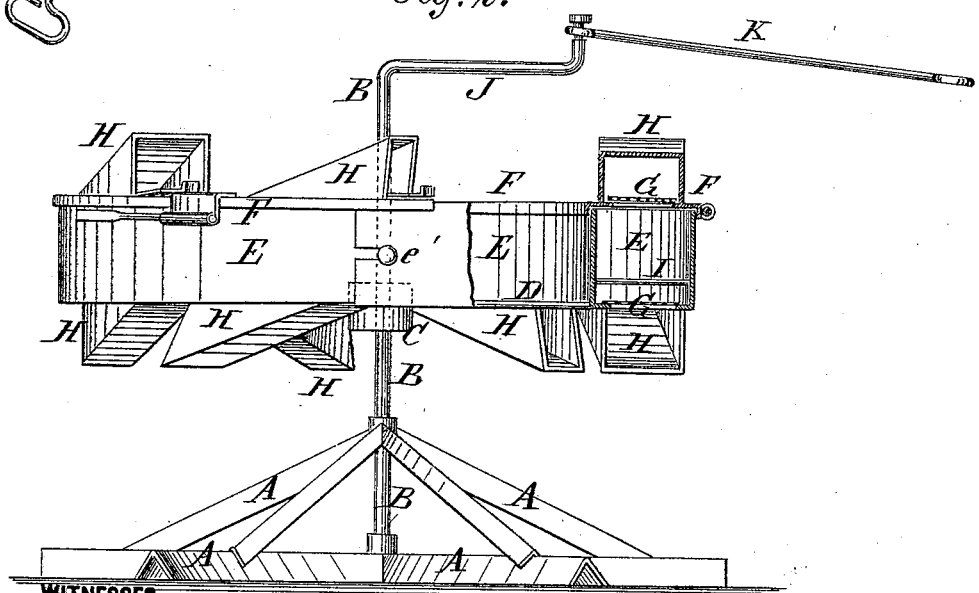
WITNESSES:
Chas. Nida
John Goethals
INVENTOR:
N. Crank
BY
ATTORNEYS.

UNITED STATES PATENT OFFICE.

NATHANIEL CRANK, OF WINSLOW, MISSOURI.

IMPROVEMENT IN TIRE-HEATING FURNACES.

Specification forming part of Letters Patent No. 175,671, dated April 4, 1876; application filed March 6, 1876.

*To all whom it may concern:*

Be it known that I, NATHANIEL CRANK, of Winslow, in the county of De Kalb and State of Missouri, have invented a new and useful Improvement in Tire-Heaters, of which the following is a specification:

Figure 1 is a top view of my improved device, one of the covers being turned back, and part being broken away to show the construction. Fig. 2 is a side view of the same, part being broken away to show the construction.

Similar letters of reference indicate corresponding parts.

The object of this invention is to furnish an improved device for heating the tires of wheels for setting, which shall be simple in construction, convenient in use, and effective in operation, enabling the tires to be heated quickly and evenly, and with a much less quantity of fuel than is necessary when they are heated in the usual way.

The invention consists in an improved tire-heater, formed of the base, the shaft, the hub and spokes, the sectional ring-box provided with cross-bars, and having openings formed in its bottom, provided with grates and hoods, and the sectional ring-cover having openings in it, provided with grates and hoods, as hereinafter fully described.

A is the base-frame or pedestal of the machine, in the center of which is formed a socket to receive a shaft, B. To the shaft B is attached a hub, C, provided with radial arms or spokes D, upon which rests a ring-box, E, about seven inches square, and which is made of iron or other material that will not be injured by fire.

The box E is made in sections, sliding upon each other and the spokes D, so that it may be contracted and expanded, to adapt it for use with larger and smaller tires, as may be required. The box E is clamped in place, when adjusted, by bolts $e'$, which pass through slots in its walls, as shown in Figs. 1 and 2. The box E is provided with a ring-cover, F, also made in sections, and which is hinged at the middle part of each section to the upper edge of the outer sides of the sections of the box E, so that they may be turned back out of the way for convenience in putting in the tires and fuel, and taking out the tires when heated.

In the bottom of the box E, and in the cover F, are formed openings, covered with grates G, to allow air to pass in, and smoke to pass out, while retaining the fuel. These draft-openings are provided with hoods H, the hoods of the box E opening forward to collect the air and force it into the box E, and the hoods of the cover F opening rearward, to facilitate the escape of the smoke. To the sides of the box E, at a little distance above its bottom, are attached cross-bars I for the tires to rest upon, so that they may be entirely surrounded with the fire.

To the upper end of the shaft B is attached, or upon it is formed, a crank, J, upon the crank-pin of which is placed an eye formed upon the inner end of a rod, K, so that the said rod K may be conveniently detached when desired. The crank J is made of such a length that it will not interfere with the operations of putting in and taking out the tires, and the rod K is made of such a length that the crank J may be conveniently operated from the outside of the box E F.

In using the device, the fuel and tires are placed in the box E, the fuel is set on fire, and the covers F are closed. The box E F is then rotated by means of the crank J and rod K, which causes the fire to burn furiously, heating the tire very quickly and with a comparatively small amount of fuel. The covers F are then turned back, and the tires are taken out and set. The device may be rotated by a crank and gear-wheels placed beneath the box, if desired.

Having thus described my invention, I claim as new and desire to secure by Letters Patent—

An improved tire-heater, formed of the base A, the shaft B, the hub and spokes C D, the sectional ring-box E, provided with the cross-bars I, and having openings in its bottom, provided with grates G and hoods H, and the sectional ring-cover F, having openings in it, provided with grates G and hoods H, substantially as herein shown and described.

NATHANIEL CRANK.

Witnesses:
 WM. COOLEY,
 JOSEPH SUDDARTH.